(12) United States Patent
Merkovsky et al.

(10) Patent No.: US 6,301,319 B1
(45) Date of Patent: Oct. 9, 2001

(54) METHOD OF SEALING A REACTOR PRESSURE VESSEL

(75) Inventors: Daniel Merkovsky, Jeanette; Alexander W. Harkness, Gibsonia; Daniel M. Trombola, Murrysville, all of PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/407,571

(22) Filed: Sep. 28, 1999

Related U.S. Application Data
(60) Provisional application No. 60/102,547, filed on Sep. 30, 1998.

(51) Int. Cl.[7] .................................................. G21C 13/028
(52) U.S. Cl. ......................... 376/205; 376/203; 376/272
(58) Field of Search ................................. 376/203, 204, 376/205, 272

(56) References Cited

U.S. PATENT DOCUMENTS

| 4,088,381 | * | 5/1978 | Harnett ................................. 339/94 A |
| 4,272,321 |   | 6/1981 | Betancourt et al. . |
| 4,274,007 | * | 6/1981 | Baatz et al. ............................ 250/506 |
| 4,335,883 | * | 6/1982 | Le Roux et al. .......................... 277/3 |
| 4,445,042 | * | 4/1984 | Baatz et al. ......................... 250/506.1 |
| 4,465,201 | * | 8/1984 | Chalfant, Jr. ............................... 220/3 |
| 4,696,790 | * | 9/1987 | Elter et al. ............................. 376/296 |
| 4,980,117 |   | 12/1990 | Blaushild ............................... 376/205 |
| 5,182,076 | * | 1/1993 | de Seroux et al. .................... 376/250 |
| 5,278,876 | * | 1/1994 | Sawabe ................................. 376/205 |
| 5,303,836 | * | 4/1994 | Childress ............................... 220/1.5 |
| 5,633,901 | * | 5/1997 | Kim et al. ............................. 376/203 |
| 5,706,319 | * | 1/1998 | Holtz .................................... 376/203 |

FOREIGN PATENT DOCUMENTS

2250891 * 4/1973 (DE) ............................... G21C/13/00

* cited by examiner

Primary Examiner—Michael J. Carone
Assistant Examiner—John Richardson

(57) ABSTRACT

A method of temporarily sealing a reactor pressure vessel during an outage permits the water level in the vessel to be drawn down to a level which enables the interior surfaces of associated structures and equipment in the primary coolant loop to be inspected while dry when the vessel is submerged in a pool of water. A reactor pressure vessel internals lifting rig is used to position a temporary reactor pressure vessel head having an elliptical shaped dome with a circumferential flange retaining a pair of spaced apart, circumferential seal rings onto a reactor pressure vessel circumferential flange without marking or damaging the reactor pressure vessel flange. Advantageously, the weight of the temporary head (together with the static head of water, which must be supported by the elliptical design of the dome) is sufficient to cause the seal rings to seal against the reactor pressure vessel flange without the need for studs or other mechanical fasteners or the need to pump out leakage from the pool of water above the reactor pressure vessel. The flanges and the rings define a space which is tested for leak-tightness.

3 Claims, 1 Drawing Sheet

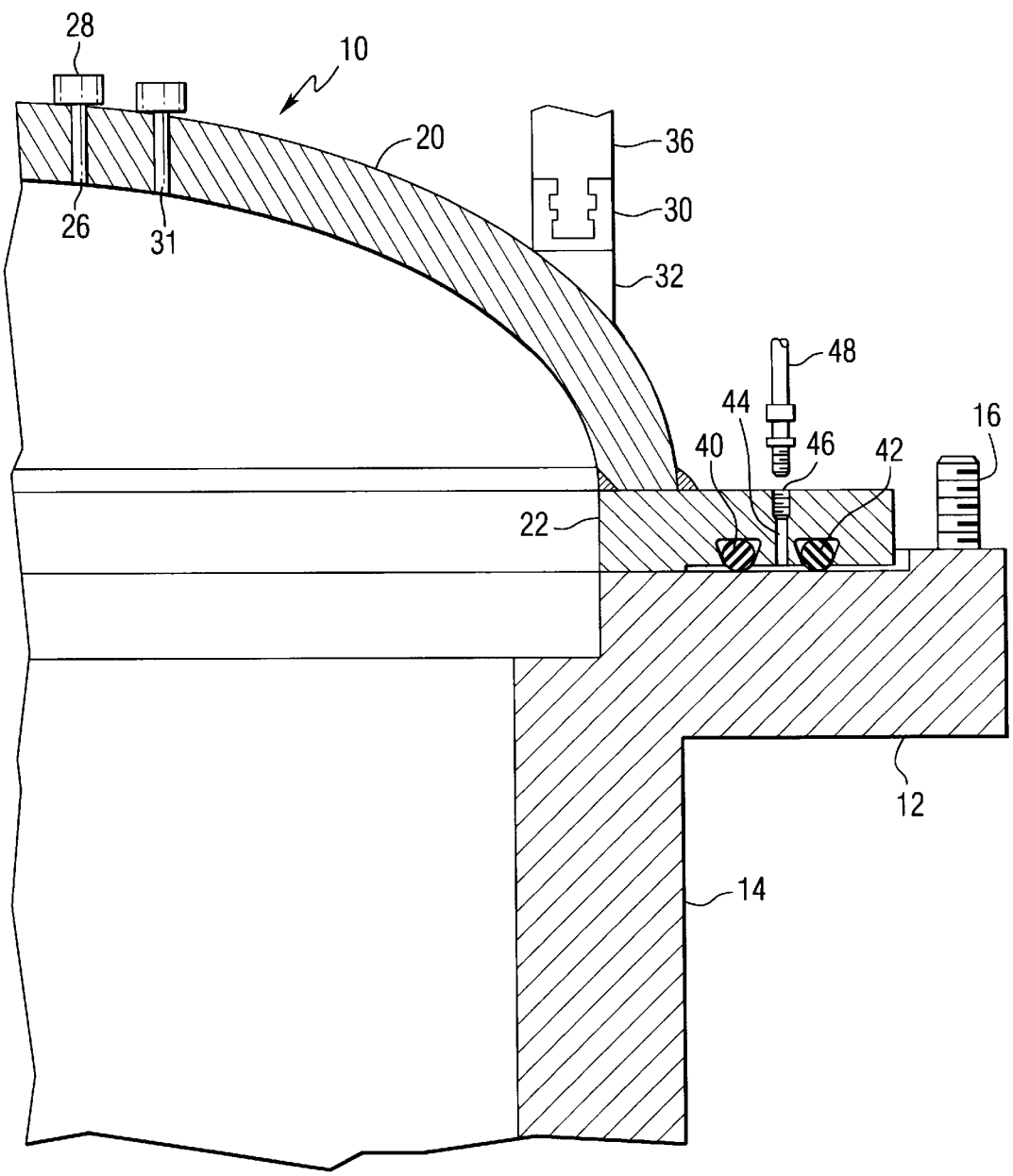

METHOD OF SEALING A REACTOR PRESSURE VESSEL

CROSS-REFERENCE TO RELATED APPLICATIONS

This application claims the benefit of U.S. Provisional Patent Application No. 60/102,547, filed Sep. 30, 1998.

BACKGROUND OF THE INVENTION

The invention relates to a method of sealing a reactor pressure vessel (RPV) and, more particularly, to a method for temporarily sealing a RPV submerged under twenty feet of water or more.

Commercial nuclear reactors for generating electrical power must be taken off-line every one to two years in order to refuel the reactors. During such refuelings and other scheduled outages when the RPVs must be opened, the refueling cavities are flooded with water to depths of twenty (20) feet or more above the RPV circumferential flanges so that their removable upper heads may be safely removed. During such outages, periodic inspections, maintenance activities and repairs may be performed on the RPVs and/or on associated vessels and equipment such as steam generators, coolant circulating pumps and the like as well as the interconnecting piping. Certain of these inspections and other activities must be performed on dry surfaces. Accordingly, the RPVs or the balance of the loops must be sealed from the pools so that the loops can be at least partially drained.

Temporary RPV heads have been designed to replace removed RPV heads in order to provide a seal between the internal portions of the RPVs (and the balance of the loops) and the pools of water in which the RPVs are submerged. These temporary RPV heads are large and heavy and expensive, special handling equipment is needed to transport them. It is desirable to employ existing on-site RPV internals lifting rigs to transport the temporary RPV heads and to guide them into position on RPV flanges. Such RPV internals lifting rigs are supported on the RPVs and normally used for transporting and positioning internal assemblies and fuel rod assemblies in the RPVS. However, the weight and/or the structural elements of the temporary RPV heads must be compatible with the lifting capabilities and/or structure of the existing lifting rigs if they are to be precisely positioned on the RPV flanges.

The temporary RPV head designs may have pumping devices carried by their domed portions. These devices pump out water which may leak into the RPVs if the temporary RPV heads are not precisely positioned on the RPV flanges by the lifting rigs. Undesirably, such devices complicate the structure and use of the temporary RPV heads.

SUMMARY OF THE INVENTION

Thus, it is an object of the present invention to provide a method for installing a light weight, mechanically simple, temporary RPV head seal on a RPV submerged in a pool of water. It is a further object to provide method for testing the leak-tightness of such a temporary RPV seal.

With these objects in view, the present invention resides in a method of sealing a RPV submerged in a pool of water, comprising the steps of: removing the RPV upper head; using a RPV internals lifting rig to position a temporary RPV head having an elliptical shaped dome with a circumferential flange retaining a pair of circumferential rings in spaced apart relationship onto a RPV circumferential flange to create a liquid-tight seal, the flanges and the rings defining a space between them; and then testing the leak-tightness of the space. In a preferred practice, the leak-tightness of the seal is determined by pressurizing the space between the two spaced rings. Most preferredly, the space is pressurized to a pressure of about 20 pounds/square inch and for about 5 minutes.

BRIEF DESCRIPTION OF THE DRAWING

The accompanying drawing shows a temporary PRV head which may be employed in the below described preferred practice of the present invention.

DESCRIPTION OF THE PREFERRED PRACTICE

The drawing schematically shows a temporary RPV head 10 resting on the flange 12 of a RPV 14 inside of circumferentially spaced studs, represented by stud 16 used to fasten the upper head (not shown) to the flange 12 during on-line power operations. As shown, the temporary RPV head 10 is in the process of being installed on the RPV 14 during, for example, a refueling outage when the reactor vessel 14 would be submerged under 20 to 30 feet of water or more (not shown) above the circumferential flange 12.

The temporary RPV head 10 has an elliptical dome 20 and a circumferential flange 22. As shown, the dome 20 may be welded to the top surface of the flange 22 along its inner and outer diameters. The elliptical design advantageously provides high strength so that the thickness of the dome may be about 1 inch or less and support the weight of a heavy flange 22 during installation and later support the weight of the water above it. The dome 20 may have a vent 26 with a vent connection 28 for connecting with a tube (not shown) extending out of the water pool in order to remove water from the RPV 14 after the temporary RPV head 10 has been installed and then to refill the RPV 14 after completing the activity. The dome 20 may also have a passageway 31 for connection with a supply line (not shown) for introducing air or other gas into the RPV to displace the water.

Three or more circumferentially spaced connector sockets, represented by connector socket 30, are attached to the dome 20 by support plates 32. As shown, connector socket 30 engages a mating connector 36 carried by a RPV internals lifting rig, such as the lifting rig of U.S. Pat. No. 4,272,321 and like assemblies. RPV internals lifting rigs used in the nuclear power industry structurally vary and are frequently employed with either roto-lock type or screw type connectors. The accompanying drawing shows the connector socket 30 and mating connector 36 as female and male elements of roto-lock type connections. The connector sockets 30 should be located on the elliptical dome 20 and otherwise adapted to carry the weight of the dome 20 and flange 22 without significant elastic deformation of the dome 20 when transported and to not interfere with support bars, legs and other structural members of the lifting rig.

The flange 22 has a pair of circumferentially extending, radially spaced, seal rings, such as O-rings 40 and 42 for sealingly resting upon the RPV flange 12. The O-rings 40 and 42 may be fabricated of an elastomer such as an ethylene propylene diene co-polymer. The O-rings may be retained by the flange 22 in a dovetailed groove as shown in the accompanying drawing or by retaining means shown by U.S. Pat. No. 4,980,117. Advantageously, such seal rings 40 and 42 will form liquid-tight seals with the RPV flange 12 under the weight of the temporary RPV head 10 and a static head of twenty (20) feet of water or more without marking or damaging the RPV flange. In addition, mechanical fasteners are not needed to provide water-tight seals and pumps are not needed to pump out large volumes of in-leaking water.

A vent 44 extends from between the O-rings 40 and 42 to a vent port 46 for connecting with a vent tube, such as vent tube 48 having a Swageloc connector or other suitable connector. Advantageously, the vent 44 may be employed in a leak test to verify that a liquid-tight seal has been established. Thus, for example, after the temporary RPV head 10 has been installed, the vent tube 48 connected and the water in the RPV 14 drawn down to a level below the flange 12, an air pressure in the vent 44 of about 20 psi or more may be established. If the pressure is maintained for about 5 minutes or longer, then the operator knows that a leak-tight temporary seal 20 has been installed. If the pressure can not be maintained, the temporary RPV head 10 may be raised upwardly of the RPV flange 12 and then reseated and the seal retested. If the pressure can not be maintained, temporary RPV head 10 may be removed from the RPV 14 and the O-rings 40 and/or 42 replaced.

While a present preferred embodiment of the present invention has been shown and described, it is to be understood that the invention may be otherwise variously embodied within the scope of the following claims of invention.

What is claimed is:

1. The method of sealing a reactor pressure vessel (RPV) submerged in a pool of water, comprising the steps of:

removing a RPV head from a RPV flange, thereby opening the RPV to the pool of water;

providing a temporary RPV head having an elliptically shaped dome and a circumferential flange, the dome having a thickness of about one inch or less and having lift rig connections, the circumferential flange having radially spaced apart grooves retaining seal rings;

attaching a RPV lifting rig to the lift rig connections of the dome of the temporary RPV head;

positioning the temporary RPV head flange on the RPV flange under the weight of the dome and attached RPV lifting rig; and then with the lifting rig attached to the lifting rig connections of the dome of the temporary RPV head, pressure testing the space between the spaced apart seal rings; and drawing water out of the RPV down to a water level below the temporary RPV head flange before hydrostatically pressure testing the space between the spaced apart seal rings.

2. The method of claim 1, wherein the space between the seal rings is pressurized to a pressure of about 20 pounds/square inch.

3. The method of claim 2, wherein the space between the seal rings is pressurized for about 5 minutes.

* * * * *